S. L. & E. A. BEEBE.
LATHE FOR TURNING STONE.
No. 171,259.          Patented Dec. 21, 1875.
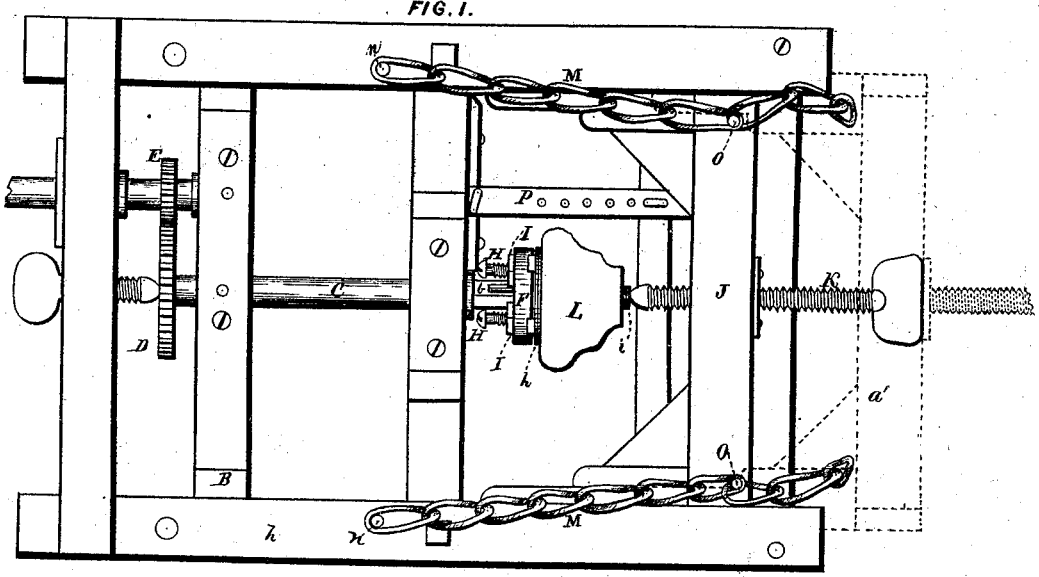
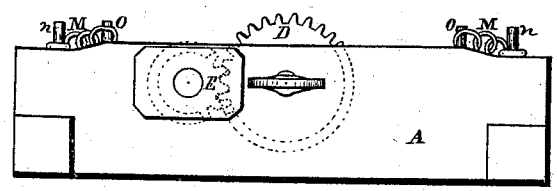
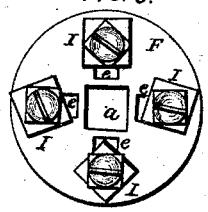 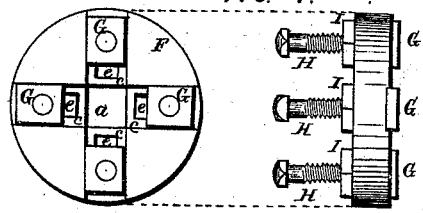
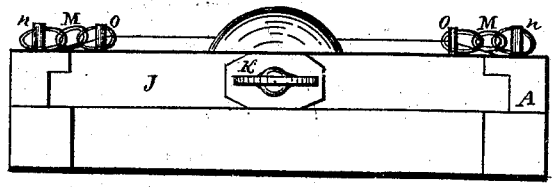
WITNESSES.          INVENTORS.

UNITED STATES PATENT OFFICE.

SIDNEY L. BEEBE AND EMMET A. BEEBE, OF NORTH RIDGEVILLE, OHIO.

IMPROVEMENT IN LATHES FOR TURNING STONE.

Specification forming part of Letters Patent No. 171,259, dated December 21, 1875; application filed November 8, 1875.

*To all whom it may concern:*

Be it known that we, SIDNEY L. BEEBE and EMMET A. BEEBE, of North Ridgeville, in the county of Lorain and State of Ohio, have invented a certain new and Improved Lathe for Turning Stone, of which the following is a complete description, reference being made to the accompanying drawings making part of this specification, in which—

Figure 1 is a plan view of the lathe. Figs. 2 and 5 are end views. Figs. 3 and 4 are detached sections.

Like letters of reference refer to like parts in the several views.

This invention is a lathe for turning stone posts, round pedestals, columns, &c., the construction and operation of which are substantially as herein described.

In the drawing, A represents a frame in the cross-bars B of which is journaled a shaft or mandrel, C. On one end of said mandrel is a cog-wheel, D, made to engage a pinion, E, whereby the mandrel is driven. On the opposite end of the mandrel is secured a chuck, F, a detached view of which is shown in Figs. 3 and 4. Said chuck consists of a circular head, having a hole, a, in the center for the end of the mandrel, whereon it is placed, and which is prevented from being pushed too far on by a key, b, Fig. 1, against which the back of the chuck bears. In the face of the chuck are made four radial grooves, c, Fig. 4, in each of which is fitted a block, G. Said blocks are retained in the grooves by screws H, passing through the said radial grooves in slots e and screwed into the blocks G, as will be seen in Figs. 3 and 4. By means of the slots the blocks are movable in the radial grooves, and by the screws and jam-nuts the blocks can be retained in any one place in the grooves that may be desired. The purpose of said blocks will presently be shown.

J is a sliding carriage or foot-block, fitted within the side of the frame A, as will be seen in Fig. 5. K is a screw center arranged in direct line with the mandrel C, and with which it co-operates, for holding the article or stone in the lathe while being turned.

As above said, the purpose of this lathe is for turning stone for hitching-posts, columns, pedestals, and other similar articles. To this end the block of stone to be turned is placed in the lathe with one end resting against the face of the chuck, as will be seen in Fig. 1, in which L represents the stone. Between said stone and chuck is interposed a piece of rubber, lead, or wood, h, Fig. 1, or other equivalent material to prevent the stone from slipping on the face of the chuck, or on the end of the mandrel, in the event the chuck is not used, and which need not be when the stone is not large. The opposite end of the stone is supported by the screw center K, the end of which centers in a metal step, i, between which and the stone is interposed a piece of wood, cloth, rubber, or other similar material to prevent the stone from slipping. The carriage or foot block J is prevented from sliding away from the stone on screwing up the center K by means of the chains M secured to the studs n in the frame A, and to the studs O in the foot-block, as will be seen in Fig. 1. By releasing the chains from the studs O the foot-block can be drawn out, as indicated by the dotted lines a', or it can be pushed in as the length of the stone to be turned may require.

The stone, when properly adjusted in the lathe, is turned into the required shape by an appropriate tool in the hands of the operator, which he holds down upon the rest P, allowing the end to project to the stone, and whereby it is fashioned into shape as the stone revolves. During the turning of the stone it is prevented from slipping on the face of the chuck, and also from slipping at the end held by the screw center by the pieces of wood, rubber, or other material interposed between the stone and chuck and center and stone referred to. This, ordinarily, will be sufficient to hold a stone of the size for a hitching-post and columns, and other articles much larger; but in the event the stone is very heavy, for large columns, &c., the several screws H of the chuck are then used, which are screwed out against the stone, and secured thereto by the jam-nuts and blocks G, thereby giving the chuck a stronger hold on the stone. The blocks G can be adjusted radially, according to the diameter of the article, in the lathe, so that in one of large diameter the screws can be pushed out toward its periphery, and thereby hold it much more securely than were the screws nearer the center. The screws, however, need not be used unless the stone is of unusual size and weight, as aforesaid. In the event it should be desirable to finish the end of the post below the periphery of the chuck, the chuck can be pushed back on the mandrel by removing the key against which it backs. The chuck being out of the way, the end of the post or other article can be turned or finished down close to the mandrel, which, in all cases, is mainly the supporting means of the stone.

What we claim as our invention, and desire to secure by Letters Patent, is—

1. The carriage or foot block J, screw center K, and chains M, in combination with the frame A, mandrel C, and chuck F, substantially in the manner as described.

2. The chuck herein described, consisting of the head F, provided with radial grooves $c$, adjustable blocks G, screws H, and nuts I, in the manner substantially as described, and for the purpose specified.

SIDNEY L. BEEBE.
EMMET A. BEEBE.

Witnesses:
C. C. REED,
L. H. JOHNSON.